Jan. 23, 1940.     C. A. BROCK     2,188,031
CENTRIFUGAL SEPARATOR
Original Filed Dec. 18, 1935
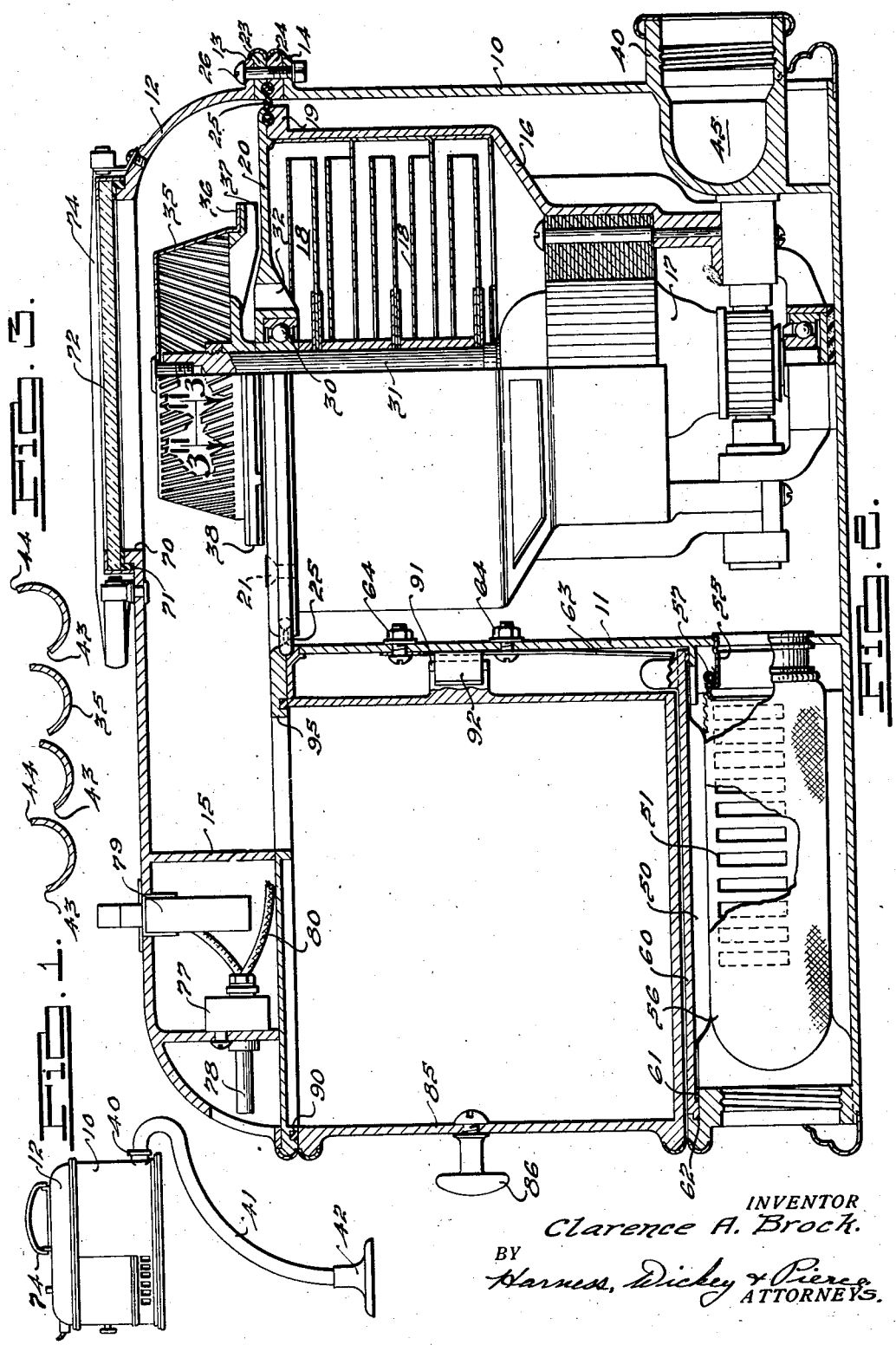
INVENTOR
*Clarence A. Brock.*
BY
*Harness, Dickey & Pierce*
ATTORNEYS.

Patented Jan. 23, 1940

2,188,031

UNITED STATES PATENT OFFICE 2,188,031

CENTRIFUGAL SEPARATOR

Clarence A. Brock, Detroit, Mich., assignor to Rexair, Inc., Detroit, Mich., a corporation of Delaware Original application December 18, 1935, Serial No. 54,966. Divided and this application July 6, 1937, Serial No. 152,070

1 Claim. (Cl. 183—77)

This invention relates generally to mechanical separator elements primarily adapted for use in connection with vacuum cleaners or other air purification apparatus. The present application is a division of applicant's prior co-pending application Serial No. 54,966 now Pat. No. 2,158,717, May 16, 1939, assigned to the assignee of the present invention, which prior co-pending application is directed to a vacuum cleaner construction embodying a mechanical dust separator of the type described and claimed in the present application.

It is an object of the present invention to provide a dust separator element which is constructed in the form of a generally frusto conical thin walled member having helically disposed slots in its sides. This member is rotated at relatively high speeds and as it rotates, air is drawn radially inwardly through the slots, the dust particles in the air impinging upon the portions intermediate and defining the slots and being thrust outwardly by centrifugal force thus insuring the fact that the air entering the interior of the frusto conical separator element will be substantially dust free.

It is a primary object of the present invention to provide a dust separator element of this generic type formed from a single integral member in which the portions intermediate and defining the slots and hereinafter but without limitation referred to as "bars," have their exterior surfaces generally rounded with the leading edge of each of the bars extending inwardly radially a slightly greater distance than the trailing edge of the adjacent bar. This construction has been found to provide a substantially more effective separation of dust from the air and one which insures the elimination of as large a proportion as possible of the dust particles passing through the apparatus.

It is a still further object of the present invention to form a dust separating member of this generic type from a single integral piece of sheet metal thus making possible substantial economies in the cost of production and yet at the same time providing a structure which is exceedingly strong and resistant to the strains and stresses incident to high speed operation.

Still further, the invention contemplates the provision of a construction in which the slots formed in the wall of the dust separating member extend substantially from top to bottom thereof in order that practically no surface space will be available for the accumulation of dust deposits interiorly of the separator element. It has been found that in the operation of mechanical separators of this generic type that even though an extremely small percentage of dust is actually passed through the slots, this dust has a tendency to be retained by centrifugal force upon any imperforate interior peripheral surface of substantial area of the dust separating element thus substantially impairing the efficiency of the apparatus. It is an object of the invention to provide a construction which overcomes these undesirable results.

Many other and further objects and advantages of the present invention will be apparent from the following specification when considered in connection with the accompanying drawing forming a part thereof.

In the drawing:

Figure 1 is a side elevational view of a vacuum cleaner which embodies the improved mechanical dust separating element of the present invention.

Fig. 2 is an enlarged longitudinal vertical sectional view taken through the vacuum cleaner shown in Fig. 1 illustrating the interior construction and arrangement of parts.

Fig. 3 is a greatly enlarged fragmentary sectional view taken substantially on the line 3—3 of Fig. 2 illustrating in detail the cross-sectional configuration of the bars and slots making up the separator element.

With more particular reference to the drawing, the specific embodiment of the invention shown therein comprises in general a casing 10 which may be formed of composite sheet metal or other suitable construction and which is illustrated as a casting. The casing is preferably generally oval in shape and is provided in its central portion with a vertically extending partition wall 11. The casing as a whole is open at the top and is adapted to receive a suitable cover 12. This cover 12 is provided with a flange 13 at its marginal edge adapted to mate with a corresponding flange 14 on the upper marginal edge of the casing 10.

On one side of the partition wall 11 in the casing 10 is mounted a blower housing 16 which has mounted therein a suitable electric motor 17 serving to drive a plurality of centrifugal fans 18 which provide a multiple stage blower construction tending to draw air axially downward through the blower housing 16. The blower housing is provided at its upper end with an annular flange 19 which has a groove in the axial face thereof. A cover plate 20 has a grooved face adapted to mate with the grooved flange 19 and is secured thereto by means of a suitable annular series of screws 21. A pair of partitioning members 23 and 24 have registering circular apertures therein slightly larger than the diameter of the flange 19 and associated cover plate 20, and have complemental circular grooves in their adjacent faces. An annular packing strip 25, having beaded edges, and preferably formed of rubber or suitable resilient composition, has one beaded edge clamped between the cover plate 20 and flange 19 by means of the screws 21 and has its other beaded edge clamped between the partitioning members 23 and 24 and securely locked in place by means of bolts 26. It will be appreciated that the bolts 26 not only serve to lock the partitioning members 23 and 24 in predetermined position but also serve to interlock the flange 14 on the casing 10 to the flange 13 on the cover 12, thus securing the cover to the casing structure. Inasmuch as the partitioning members 23 and 24 have their marginal edges, throughout some considerable extent, exposed exteriorly of the casing, throughout this exposed area they may be provided with suitable finish moldings 28 to provide an attractive exterior appearance.

The cover plate 20 has mounted substantially centrally thereof an annular series of ball bearings 30 in which is journaled a blower shaft 31. This blower shaft 31 is preferably directly connected to the electric motor 17 and serves to drive the vertical series of centrifugal fans 18 which tend to draw air downwardly through the blower housing. Surrounding the bearing structure 30 in the cover member 20 is an annular series of inlet apertures 32 which serve to permit the flow of air from the upper portion of the casing enclosed by the cover plate, downwardly into the multi-stage blower 18. Secured to the upper end of the shaft 31 of the blower, above the cover plate 20, is a mechanical dust separator element 35 adapted to be driven by the shaft.

In applicant's prior co-pending application Serial No. 723,840, filed May 4, 1934, a dust separating element somewhat similar to the dust separating element 35 is disclosed, the dust separating element, as will hereinafter more clearly be seen, is quite different in construction and function, and has been found to be considerably more efficient in operation. While in the above co-pending application, auxiliary means are shown and required to prevent accumulation of dust interiorly of the dust separator element, the present invention contemplates the provision of a dust separator element which is so constructed and designed that such auxiliary means may be entirely dispensed with.

While the element 35 may be formed in any convenient manner, it has been found preferable to construct it from a single, integral sheet metal stamping to provide a frusto-conical structure having helically extending slots throughout substantially its entire peripheral surface. It is considered extremely important that no substantial imperforate peripheral surface area exists internally of the dust separator element because it has been found that a certain limited amount of dust which passes through the slots in the surface of the element tends to build up on such surfaces and hence necessitates relatively frequent removal of the dust separator element and cleaning of the interior thereof. The slots in the peripheral surface of this dust separator element are defined by helically disposed bars which, it may be seen by reference to Fig. 3, have their exterior surfaces rounded and the forward or leading edges 44 thereof extending radially inwardly a slightly greater distance than the trailing edges 43. It will be apparent from this construction that, as the dust separator element rotates, in the direction indicated by the arrow, the air entering the slots therein is required to follow a relatively tortuous path and due to the inertia of the dust particles, it will be seen that they will necessarily impinge upon the rounded surface of the bars and be centrifugally driven away from the element, thus preventing their entry into the interior thereof.

The specific shape of the separator element 35 has been found to be a very important factor in preventing the accumulation of dust interiorly thereof. It has been found that by accurately regulating the shape proportions of the separator elements, building up of dust on the inside surface is effectively prevented. It has been found particularly satisfactory to form the dust separator element of a relatively short axial length so that its axial length is approximately one-third of the diameter of its large end and about one-half the diameter of its smaller end. The actual physical size of the element as a whole is relatively unimportant as long as the proper proportions are maintained. It has been further found particularly desirable that the separator be formed with a flat top which lies in a plane transverse to the axis of rotation of the element as a whole.

The dust separator element 35 is provided at its lower axial end with a radially extending flange 36 which is mounted on a suitable spider 38 secured to the shaft of the motor 31. It will be seen that as the motor 17 is run, air will be drawn inwardly through the slots in the separator element 35 by means of the centrifugal blowers 18 and dust in such air will impinge upon the rounded surfaces of the bars serving to define these slots and be centrifugally driven away. In order to insure that no dust-laden air will enter the necessary clearance between the dust separator element and the cover plate 20, a series of radially disposed vanes 37 are formed on the lower side of the spider 38. These vanes or blades act as a centrifugal fan and maintain a constant but relatively small outflow of air through this space, thus insuring that no dust-laden air will enter the interior of the dust separator element at this point. It will, therefore, be seen that all air which enters the interior of the blower housing will have been processed to remove the dust therefrom and that a much smaller, but equally constant outflow of air will be created by the vanes 37 operating in the clearance between the dust separator element and the cover plate 20, thus insuring that all air passing through the annular series of inlet ports 32 to the blowers will be substantially dust-free.

The casing 10 has an inlet opening 40 which may be formed integrally therewith and may be internally threaded to facilitate the connection of a flexible conduit 41 thereto which is adapted to be connected to any suitable nozzle, such for example as 42. An inlet duct 45 communicates through a conduit (not shown) with the space interiorly of the cover member 12 to conduct air taken in through the inlet 40 to a point adjacent the exterior of the mechanical separator member 35.

In the lower side of the casing on the opposite side of the partition wall from the portion in which the motor and blower are mounted, is a filter compartment generally designated as 50. Suitable louvers 51 are provided in the wall of the casing to permit the escape of air from the filter compartment 50. An outlet aperture is formed in the partition wall 11 to provide communication between the compartment housing, the motor and blower, and the filter compartment and this aperture has preferably permanently mounted therein a nipple 55 which is adapted to receive a dust filter bag 56 of a shape conforming substantially to the shape of filter compartment 50. This filter bag 56 is preferably secured on the nipple 55 by means of a garter spring 57 or other suitable securing means. The filter compartment is closed at its upper side by means of a removable partition member 60 seated on a suitable gasket 61 and having one of its edges secured in a recess 62 formed in the casing 10. The opposite edge of this partition member 60 is retained in position by means of a spring element 63 secured to the partition wall 11 by means of a pair of bolts 64. This spring element 63 has a further important function which will hereinafter be clearly seen.

From the foregoing, it will be clear that dust-laden air taken in by the nozzle 42 will be conducted through the flexible tube 41 into the inlet 40. From the inlet 40 it will be conducted upwardly through the partition walls 23 and 24 into the upper portion of the casing in which is located the rotary dust separator element 35. It will be clear that the suction pressure generated by the multi-stage fan 18 driven by the electric motor 17 will draw this dust-laden air toward the separator element 35 and that the separator element will function to remove from the air by centrifugal force, the dust particles, and will draw only substantially dust free air downwardly through the blower housing. It will be seen that the only outlet for the air drawn into the blower housing is through the nipple 55 in the partition wall 11 and hence into the filter bag 56 secured thereto. The filter bag will, therefore, serve to collect any dust which was not extracted from the air by means of the centrifugal dust separator element 35 and consequently only substantially dust free air will be passed from the filter compartment 50 out through the louvers 51.

It will likewise be seen that due to the action of the blowers 18, a substantial pressure differential will be created between the compartment above the partitioning members 23 and 24 and the compartment in which the blower housing is mounted. Due to this substantial pressure differential the greater pressure in the lower compartment in which the blower housing is mounted, will tend to move the blower housing, blower, and motor connected thereto, upwardly toward the area of decreased pressure. This upward movement of the blower housing and motor will be resisted by the resilient packing ring element 25 which is clamped between the partitioning elements 23 and 24 at its outer periphery and between the blower housing 16 and cover plate 20 in its inner periphery. This pressure differential has been found to be sufficiently great so that the entire blower housing, dust separator, blower and motor associated therewith, will be raised slightly when the blower is operated, thus tensioning the resilient packing element 25 and supporting the blower housing entirely free from the casing structure except for the interconnection of the resilient packing member 25. It will be appreciated that this construction serves materially to prevent the sound and vibration resulting from the relatively high speed operation of the blower and dust separator elements from being transmitted to the casing and consequently virtually eliminates the noise usually attendant upon the operation of machines of this general type. A resilient padding element 66 may be secured to the lower axial end of the motor in order to cushion this portion of the apparatus with respect to the casing 10. It will be appreciated, however, that as the blower is operated, the motor, blower housing, and dust separator, which together provide a substantially unit construction, will, due to the action of the blower, be raised from the floor of the casing 10 and will be maintained entirely out of contact therewith during the time the machine is operated. The function of the resilient cushioning member 66 is merely to provide a resilient seat for the blower housing during times when the machine is not in operation. Consequently, it will be seen that this resilient cushioning member serves to relieve the annular resilient member 25 from unnecessary strain in supporting the blower housing when the machine is not operating. It is to be particularly noted that the rubber ring 25 is placed under tension as the blower unit rises in operation. This is important from the standpoint of reducing the transmission of audible vibrations from the blower unit to the main casing as it has been found that were such rubber placed under compression, instead of tension, the reduction of noise would be rather insignificant as compared to the present case where the rubber is placed under tension.

A suitable circular aperture 70 is provided in the upper surface of the cover 12 and has surrounding it a packing member 71 upon which is seated a removably mounted glass cover panel 72 retained in position by means of a suitable frame 73. It will be clear that this cover panel 72 is sufficiently large in order that access may be had to the rotatable dust separator element 35 and that this element may be cleaned, adjusted, dismounted or replaced at will without disturbing the mounting of the cover 12 on the casing 10.

As may be desired, a handle 74 may be suitably secured to the top of the cover member 12 in order to provide convenient means for transporting the dust separating apparatus from place to place. The opposite end of the cover section 12 to that in which the rotary dust separator element is mounted is partitioned off by means of an integrally formed partition wall 76 which mates with the partition member 23 to provide a closed compartment at the upper end of the dust separator cover. In this compartment is mounted a suitable terminal block 77 to which is connected a cord 78 adapted to connect the dust separator with a suitable source of electric current. Also mounted within this compartment is a suitable switch 79 which serves to provide means by which the electric motor may be started and stopped. Connection wires 80 extend from the switch 79 and connector block 77 down to the electric motor 17.

In the space between this portion of the cover section 12, just described, and the upper surface of the filter compartment 50, is located a removable slidably mounted dust bin 85. This dust bin 85 preferably has an exterior face provided with a suitable handle 86 and mates closely with the adjacent walls of the casing 10 and cover 12. The upper marginal edge of the dust bin is preferably beaded and provided with a finish molding 88 which, when the dust bin is slid into position, will mate with the finish molding 28 on the lower partition member 24 to provide a substantial continuation thereof which it will be seen extends entirely around the dust separator casing. The drawer or dust bin 85 preferably extends substantially the full width of the casing 10 and the under side of the partition member 23 is preferably provided with a resilient sealing strip 90 seated therein throughout the extent which this partition element mates with the drawer in order to provide an effective and tight seal of the partition member 23 with respect to the top marginal edge of the bin 85. The rear wall of the bin on its exterior side substantially in the central portion thereof is provided with a spearhead 91 preferably formed integrally with the drawer and adapted to enter between the spaced prongs 92 of the spring element 63. These prongs 92 are preferably formed by bending suitable lateral projections on the spring element 63 between the points at which this spring element is secured to the partition wall 11. It will thus be appreciated that the dust bin 85 is maintained in predetermined position with respect to the casing in which it is mounted and that it is locked in position by means of the spring element 92 and the mating spearhead 91. It will further be seen that the top marginal edge of this drawer is effectively sealed by means of the resilient sealing element 90.

A suitable aperture 95 interconnects the portion of the casing in which the bin 85 is mounted with the portion of the casing surrounding the rotary separator element 35. Due to the centrifugal action of the rotary separator element 35 the dust particles in the air entering the portion of the casing in which this element is located will be driven to that portion farthest away from the rotary separator element 35 and will consequently drop directly into the dust bin 85. From the foregoing, it will be appreciated that as the nozzle 42 serves to draw dust from articles being cleaned, this dust will be conveyed through the inlet 40 and intake conduit 45 into the chamber surrounding the rotary dust separator element. At this point the dust particles will, by means of the rotary dust separator, be separated from the air and will drop into the bin 85. The clean air passes downwardly through the multiple stage blower and out through the filter bag 56 which serves to subject the air to further cleaning action. From the construction described above, it will be apparent that the dust bin 85 may be conveniently removed whenever it is desired by bodily separating it from the casing 10. Accumulated dust, therefore, may be emptied from the bin 85 at convenient intervals without in any way disassembling the machine.

Many other and further modifications of the invention falling within the scope of the subjoined claim will be apparent to those skilled in the art.

What I claim is:

A dust separator element comprising a hollow sheet metal member of generally frustoconical shape having a plurality of slots in its peripheral surface, the material between said slots being preformed to outwardly rounded bars, the leading edges of said bars extending inwardly further than the trailing edges thereof.

CLARENCE A. BROCK.